(12) United States Patent
Sato

(10) Patent No.: US 8,531,615 B2
(45) Date of Patent: Sep. 10, 2013

(54) IMAGE DISPLAY DEVICE AND PROJECTION DEVICE

(75) Inventor: Yuji Sato, Kanagawa (JP)

(73) Assignee: Sony Corporation (JP)

( * ) Notice: Subject to any disclaimer, the term of this patent is extended or adjusted under 35 U.S.C. 154(b) by 131 days.

(21) Appl. No.: 13/066,045

(22) Filed: Apr. 5, 2011

(65) Prior Publication Data

US 2011/0249205 A1    Oct. 13, 2011

(30) Foreign Application Priority Data

Apr. 12, 2010   (JP) .................................. P2010-091705

(51) Int. Cl.
*G02F 1/1335*    (2006.01)

(52) U.S. Cl.
USPC .................................................. 349/5; 349/8

(58) Field of Classification Search
USPC ........................................................ 349/5–9
See application file for complete search history.

(56) References Cited

U.S. PATENT DOCUMENTS

2006/0274412 A1* 12/2006 Koyama et al. ............... 359/443

FOREIGN PATENT DOCUMENTS

| JP | 2005-134567 A | 5/2005 |
| JP | 2006-201413 A | 8/2006 |
| JP | 2007-108735 A | 4/2007 |
| JP | 2007-114328 A | 5/2007 |

* cited by examiner

*Primary Examiner* — Edward Glick
*Assistant Examiner* — David Chung
(74) *Attorney, Agent, or Firm* — Lerner, David, Littenberg, Krumholz & Mentlik, LLP

(57) ABSTRACT

An image display device includes an image display element that displays images, a light blocking member that includes a light blocking portion blocking light from reaching a peripheral portion of the image display element, and a dust-proof member that is provided to surround the outer peripheries of the image display element and the light blocking portion such that the image display element and the light blocking portion positioned inside the dust-proof member have a dust-proof structure, wherein the light blocking member includes a heat dissipation portion which is integrally formed with the light blocking portion and which releases heat from the light blocking portion to the outside of the dust-proof member.

9 Claims, 7 Drawing Sheets

IMAGE DISPLAY DEVICE AND PROJECTION DEVICE

CROSS-REFERENCE TO RELATED APPLICATION

The present application claims priority from Japanese Patent Application No. JP 2010-091705 filed in the Japanese Patent Office on Apr. 12, 2010, the entire content of which is incorporated herein by reference.

BACKGROUND OF THE INVENTION

1. Field of the Invention

The present invention relates to an image display device provided with a light blocking member which blocks light from reaching a peripheral portion of an image display element and a projection device.

2. Description of the Related Art

In the related art, a liquid crystal projector (projection device) includes a light source unit constituted by lamps or the like supported by a reflector, an image forming unit forming pictures, and a projection unit constituted by lenses or the like projecting pictures. The image forming unit is provided with a liquid crystal panel (an image display device) including an image display element and the like.

Here, as the image display device, there is a reflective liquid crystal element having a display surface used to display images and a rear surface disposed opposite to the display surface. Further, a support member having a heat dissipation fin supports the rear surface of the liquid crystal element, and thereby heat generated from the liquid crystal element is released to the outside.

SUMMARY OF THE INVENTION

However, according to a technique disclosed in Japanese Unexamined Patent Application Publication No. 2005-134567, the rear surface side of the liquid crystal element can be cooled, but heat from the display surface side may not be released to the outside. Specifically, since a light blocking member which blocks light from reaching a peripheral portion of the display surface is disposed in the display surface side of the liquid crystal element, the light blocking member as well as the liquid crystal element also emits heat. Japanese Unexamined Patent Application Publication No. 2005-134567 does not disclose a countermeasure concerning the heat emission from the light blocking member.

FIG. 7 shows a cross-sectional view of a reflective liquid crystal panel 300 for such a liquid crystal projector in the related art.

As shown in FIG. 7, the reflective liquid crystal panel 300 includes a liquid crystal element 310 having a transparent electrode substrate 311 disposed in the display surface side which displays images, a pixel electrode substrate 312 disposed in the rear surface side, and a liquid crystal layer 313 interposed between the substrates, a dust-proof rubber 320 which seals the periphery of the liquid crystal element 310 for a dust-proof structure, a light blocking plate 330 as a light blocking member which blocks light from reaching the peripheral portion of the transparent electrode substrate 311, and a support member 340 which supports the liquid crystal element 310 (the pixel electrode substrate 312).

Here, light generated from a light source enters the transparent electrode substrate 311 and the light blocking plate 330. For this reason, temperature of the liquid crystal element 310 increases and the light blocking plate 330 is heated. Heat from the liquid crystal element 310 is released to the outside through a heat dissipation fin 350 which is installed in the support member 340 in the pixel electrode substrate 312 side.

On the other hand, heat from the light blocking plate 330 is released to the inside the sealed space 301 formed by the dust-proof rubber 320. Thereby, the sealed space 301 increases in temperature, and temperature of the light blocking plate 330 and the sealed space 301 becomes higher with the passage of time. Moreover, if radiation heat from the light blocking plate 330 to the liquid crystal element 310 increases, black unevenness occurs in the liquid crystal element 310, and this causes picture quality to be deteriorated.

It is desirable to enable a light blocking member to have a heat dissipation countermeasure for the improvement of picture quality.

According to an embodiment of the present invention, there is provided an image display device including an image display element that displays images; a light blocking member that includes a light blocking portion blocking light from reaching the peripheral portion of the image display element; and a dust-proof member that is provided to surround the outer peripheries of the image display element and the light blocking portion such that the image display element and the light blocking portion positioned inside the dust-proof member have a dust-proof structure, wherein the light blocking member includes a heat dissipation portion which is integrally formed with the light blocking portion and which releases heat from the dust-proof member to the outside of the dust-proof member.

According to an embodiment of the present invention, there is provided a projection device including an image display element that displays images; a light blocking member that includes a light blocking portion blocking light from reaching a peripheral portion of the image display element; a dust-proof member that is provided to surround the outer peripheries of the image display element and the light blocking portion such that the image display element and the light blocking portion positioned inside the dust-proof member have a dust-proof structure; a light source that generates light entering the image display element; and a lens that projects images displayed in the image display element, wherein the light blocking member includes a heat dissipation portion which is integrally formed with the light blocking portion and which releases heat from the dust-proof member to the outside of the dust-proof member.

According to the embodiment of the present invention, there is provided a light blocking member including the light blocking portion which blocks light from reaching the peripheral portion of the image display element. Further, the light blocking member includes the heat dissipation portion which releases heat from the light blocking portion to the outside of the dust-proof member. Thereby, heat from the light blocking portion of the light blocking member is released to the outside of the dust-proof member through the heat dissipation portion, and an increase in temperature of the light blocking portion is suppressed.

According to the present invention, increase in temperature at the light blocking portion is suppressed by the heat dissipation portion of the light blocking member, and thus radiation heat from the light blocking portion to the image display element can be reduced. As a result, it is possible to prevent the occurrence of black unevenness in the image display element, and to improve picture quality.

DESCRIPTION OF THE PREFERRED EMBODIMENTS

Hereinafter, embodiments of the present invention will be described with reference to the accompanying drawings.

Here, a projection device according to an embodiment of the present invention is referred to as a liquid crystal projector 10 in the following embodiments. An image display device according to an embodiment of the present invention is referred to as reflective liquid crystal panel 100 and 200 for the liquid crystal projector 10 in the following embodiments.

Further, the description will be made in the following order.

1. A first embodiment (an image display device: a configuration example of a light blocking member)
2. A second embodiment (an image display device: a configuration example having an active cooling unit)

Configuration Example of Projection Device

Figure 1:
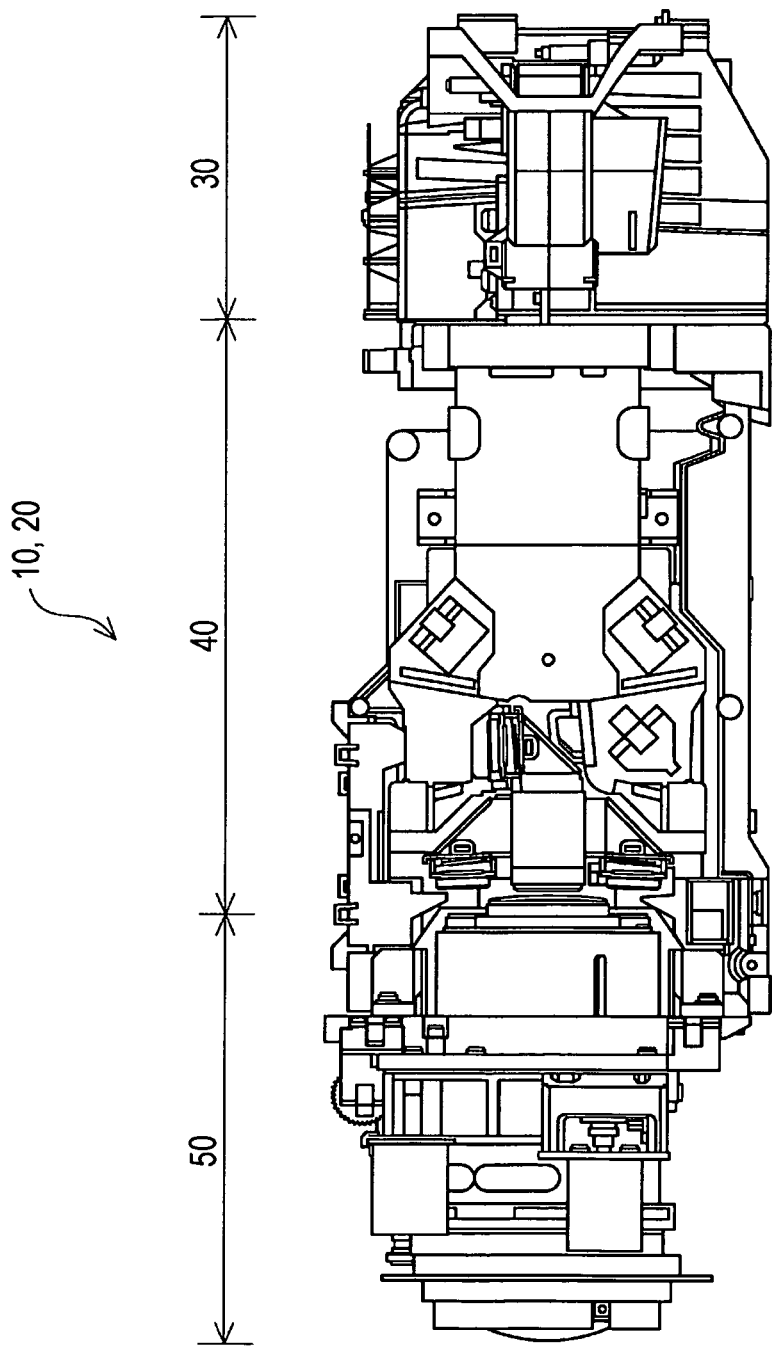
FIG. 1 is a side view illustrating an optical unit of a liquid crystal projector as a projection device according to an embodiment of the present invention.

FIG. 1 is a side view illustrating an optical unit of a liquid crystal projector 10 as a projection device according to an embodiment of the present invention.

Figure 2:
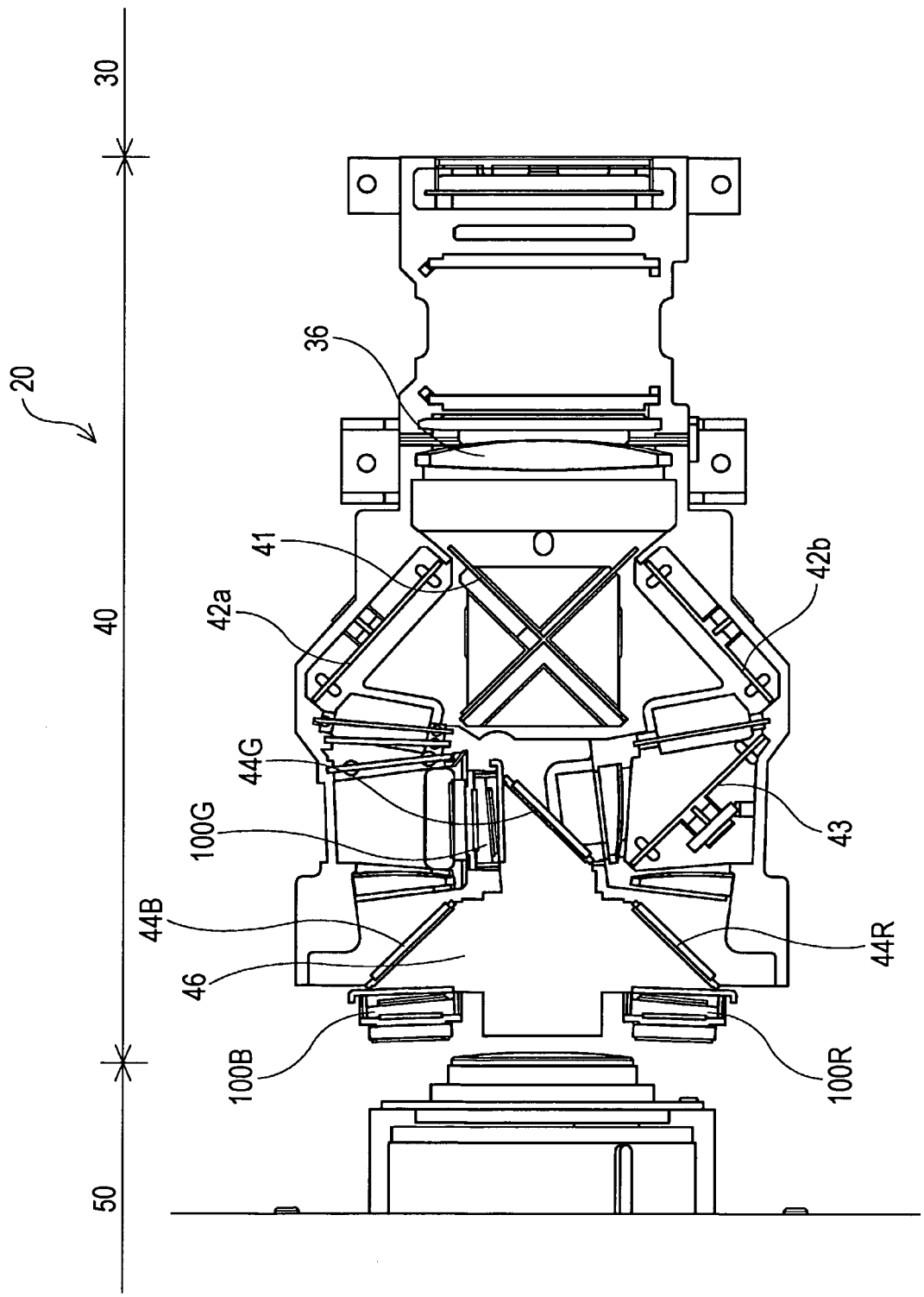
FIG. 2 is a side view illustrating a peripheral portion of an image forming unit of the optical unit shown in FIG. 1.

Also, FIG. 2 is a side view illustrating a peripheral portion of an image forming unit 40 of the optical unit 20 shown in FIG. 1.

Figure 3:
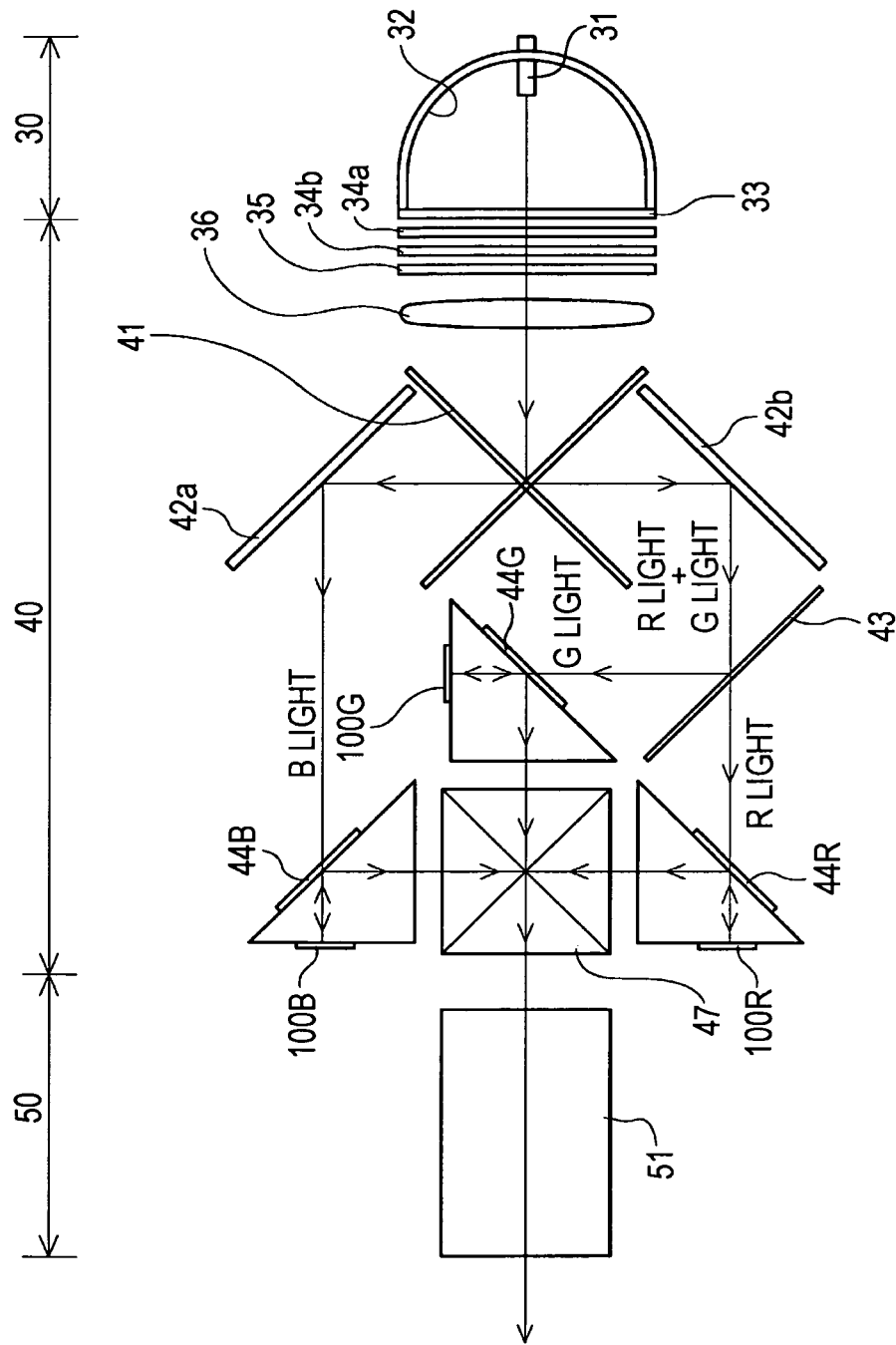
FIG. 3 is a conceptual diagram illustrating a configuration of the liquid crystal projector as a projection device according to an embodiment of the present invention.

FIG. 3 is a conceptual diagram illustrating a configuration of the liquid crystal projector 10 as a projection device according to an embodiment of the present invention.

As shown in FIGS. 1 to 3, an optical unit 20 in the liquid crystal projector 10 in this embodiment includes a light source unit 30, an image forming unit 40, and a projection unit 50.

Here, the light source unit 30 includes a lamp 31 (corresponding to a light source according to an embodiment of the present invention), a reflector 32, and a protective glass 33.

The lamp 31 may use a metal halide lamp, a xenon lamp, a halogen lamp, or the like, which generates non-polarized white light including red light (R light), green light (G light), and blue light (B light), and a further variety of existing lamps in the related art. The white light generated from the lamp 31 is changed to parallel light after being reflected by the reflector 32, and emitted from the protective glass 33.

In addition, the image forming unit 40 includes fly eye lenses 34a and 34b, a PS conversion element 35, and a condenser lens 36.

The fly eye lenses 34a and 34b are disposed as a pair at positions of being spaced apart from the protective glass 33, and make the luminance distribution of light emitted from the protective glass 33 uniform. The PS conversion element 35 includes polarization beam splitters arranged in a strip shape and phase difference plates which are provided intermittently corresponding to the polarization beam splitter, and converts the polarization directions. Thereby, the light emitted from the condenser lens 36 is converted into parallel light which is arranged as predetermined polarization light (for example, as p polarization light) and then enters the image forming unit 40.

The image forming unit 40 includes a cross-dichroic mirror 41, a reflection mirrors 42a and 42b, and a dichroic mirror 43.

The white light beams emitted from the condenser lens 36 are divided into a light beam of a blue wavelength range on the short wavelength side (B light beam) and light beams of red and green wavelength ranges on the long wavelength side (R light beam and G light beam), by the cross-dichroic mirror 41. The B light beam is reflected by the reflection mirror 42a, and the R and G light beams are reflected by the reflection mirror 42b. Further, the G light beam on the short wavelength side of the R and G light beams is reflected by the dichroic mirror 43 and the R light beam on the long wavelength side passes through the dichroic mirror 43. Therefore, the G light beam and the R light beam are also divided.

The image forming unit 40 includes polarization elements 44R, 44G and 44B, reflective liquid crystal panels 100R, 100G and 100B, a spacer plate 46, and a cross-dichroic prism 47. The polarization elements 44R, 44G, and 44B and the liquid crystal panels 100R, 100G and 100B are fixed to lateral surfaces of the spacer plate 46, and the spacer plate 46 is fixed to the upper and lower surfaces of the cross-dichroic prism 47.

The polarization element 44R makes the R light which is the p polarization light, which has passed through the dichroic mirror 43, pass through and enter the liquid crystal panel 100R. The liquid crystal panel 100R used to display red image information applies picture signals corresponding to the R light, and outputs modulated R light by rotating the polarization direction of the R light. The R light converted into s polarization light through the spatial modulation in the liquid crystal panel 100R is reflected by the polarization element 44R and then enters the cross-dichroic prism 47.

In the same manner, the polarization element 44G makes the G light which is the p polarization light, which has been reflected by the dichroic mirror 43, pass through and enter the liquid crystal panel 100G. The liquid crystal panel 100G used to display green image information applies picture signals corresponding to the G light, and outputs modulated G light by rotating the polarization direction of the G light. The G light converted into s polarization light through the spatial modulation in the liquid crystal panel 100G is reflected by the polarization element 44G and then enters the cross-dichroic prism 47.

In the same manner, the polarization element 44B makes the B light which is the p polarization light, which has been divided by the cross-dichroic mirror 41 and reflected by the reflection mirror 42a, pass through and enter the liquid crystal panel 100B. The liquid crystal panel 100B used to display blue image information applies picture signals corresponding to the B light, and outputs modulated B light by rotating the polarization direction of the B light. The B light converted into s polarization light through the spatial modulation in the liquid crystal panel 100B is reflected by the polarization element 44B and then enters the cross-dichroic prism 47.

The cross-dichroic prism 47 synthesizes the incident R, G and B light into one picture light beam which is guided to the projection unit 50. The picture light beam guided to the projection unit 50 is enlarged and projected on a screen via a lens tube 51 having a lens for projection.

The liquid crystal projector 10 may be used as not only a liquid crystal projector for business usage having a relatively small magnification power but also a liquid crystal projector for a hall or a theater having a large magnification power.

1. A First Embodiment: A Configuration Example of the Image Display Device

Figure 4:
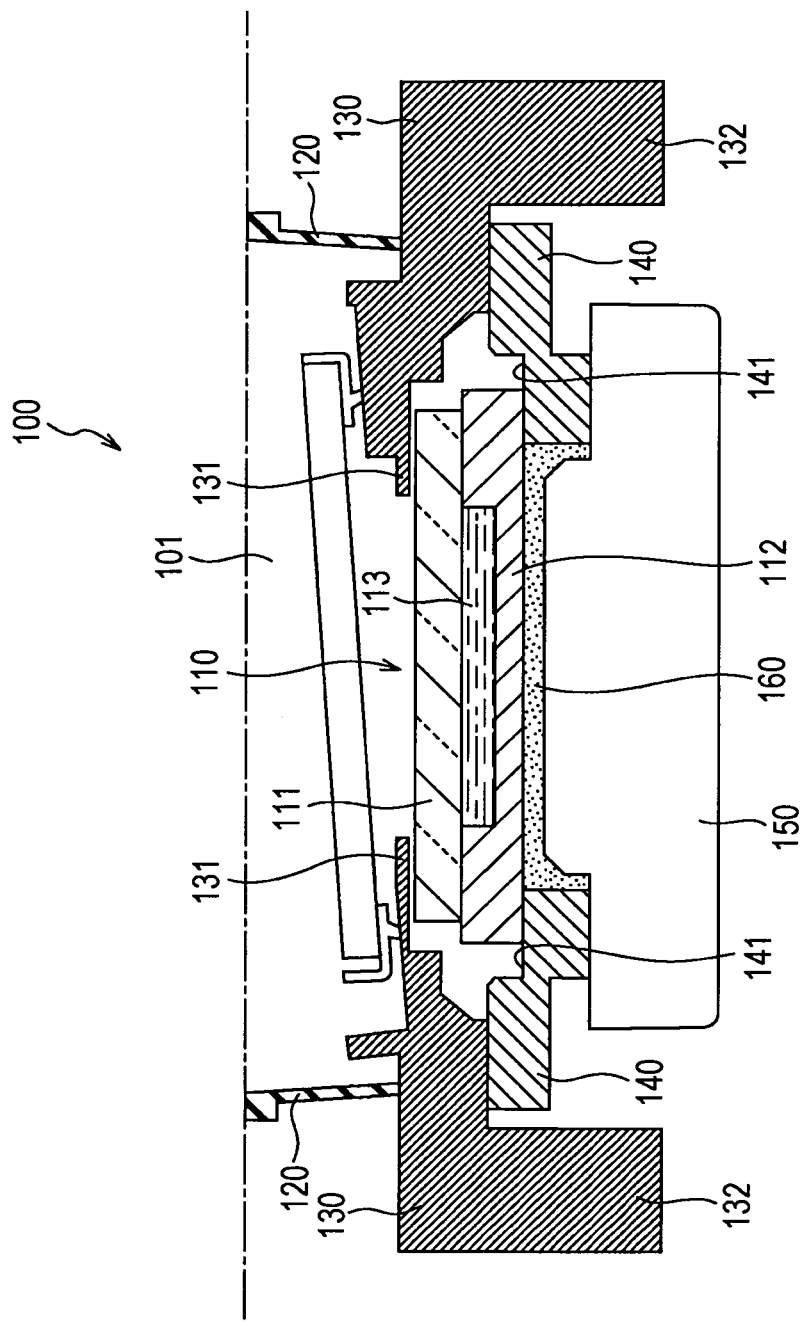
FIG. 4 is a cross-sectional view illustrating a reflective liquid crystal panel (first embodiment) for a liquid crystal projector, as an image display device according to an embodiment of the present invention.

FIG. 4 is a cross-sectional view illustrating the reflective liquid crystal panel 100 (the first embodiment) for the liquid crystal projector 10 (see FIG. 3), as an image display device according to an embodiment of the present invention.

Figure 5:
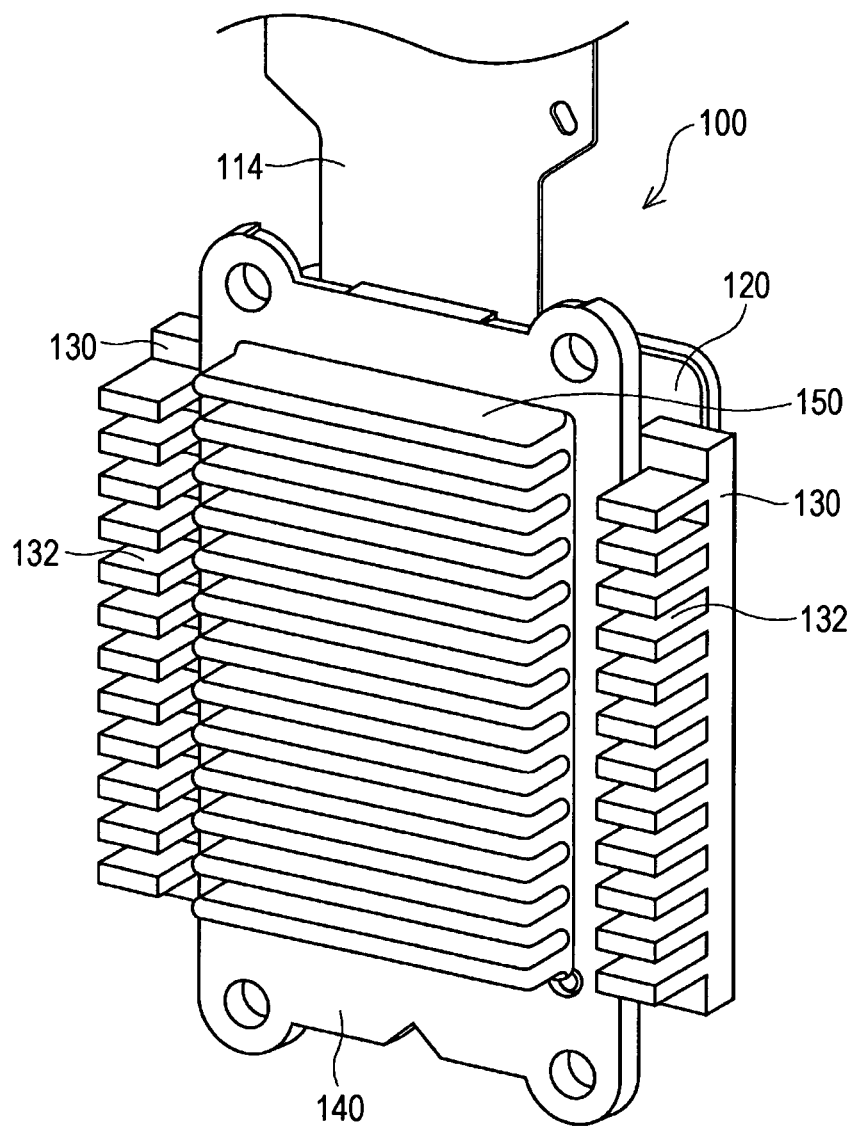
FIG. 5 is a perspective view illustrating a reflective liquid crystal panel (first embodiment) for a liquid crystal projector, as an image display device according to an embodiment of the present invention.

FIG. 5 is a perspective view illustrating a reflective liquid crystal panel 100 (the first embodiment) for the liquid crystal projector 10, as an image display device according to an embodiment of the present invention.

The liquid crystal panel 100 shown in FIGS. 4 and 5 corresponds to the liquid crystal panels 100R, 100B and 100G shown in FIG. 3. The liquid crystal panel 100 includes a liquid crystal element 110 (corresponding to an image display element according to an embodiment of the present invention), a dust-proof rubber 120 (corresponding to a dust-proof member according to an embodiment of the present invention) which seals a peripheral portion of the liquid crystal element 110 such that the liquid crystal element 110 has a dust-proof structure, and a light blocking member 130 which blocks light from reaching the peripheral portion of the liquid crystal element 110.

Here, the liquid crystal element 110 includes a transparent electrode substrate 111 disposed in a display surface side of the liquid crystal element 110, a pixel electrode substrate 112 disposed in a rear surface side, and a liquid crystal layer 113 interposed between the transparent electrode substrate 111 and the pixel electrode substrate 112. Further, the liquid crystal element 110 displays images by modulating and reflecting light from the lamp 31 (see FIG. 3) with pixel units based on image signals supplied from a flexible electrode board 114.

The transparent electrode substrate 111 is provided with a glass substrate and transparent electrodes which are formed on the glass substrate facing the pixel electrode substrate 112.

The transparent electrodes are made of, for example, an indium tin oxide film which allows light to pass therethrough and which is a solid solution of tin oxide and indium oxide. Further, the transparent electrodes are applied with a voltage common to an entire pixel region (for example, a ground voltage).

The pixel electrode substrate 112 includes a silicon substrate on which active driving circuits constituted by transistors and capacitors are formed. Reflective pixel electrodes are formed on a surface of the silicon substrate facing the liquid crystal layer 113. The pixel electrode substrate 112 controls each pixel depending on voltages applied from the flexible electrode board 114 and forms images in the whole pixels.

The liquid crystal element 110 is supported by a support member 140 which is fixed to the rear surface side of the pixel electrode substrate 112. Specifically, the support member 140 has a support surface 141 which comes into contact with the rear surface of the pixel electrode substrate 112 and supports the liquid crystal element 110, and a concave portion which does not come into contact with the rear surface of the pixel electrode substrate 112. The position of the liquid crystal element 110 is determined through the contact between the support surface 141 and the pixel electrode substrate 112.

A convex portion of a heat dissipation fin 150 is inserted into the concave portion of the support member 140, and the pixel electrode substrate 112, the support member 140, and the heat dissipation fin 150 are fixed by a filler 160 which fills the concave portion. The filler 160 has a heat conductivity and allows heat from the pixel electrode substrate 112 to efficiently move to the heat dissipation fin 150 via the filler 160. The heat dissipation fin 150 is provided with plural fins so as to increase a contact area with air by increasing a surface area. Thereby, heat from the liquid crystal element 110, generated by the light from the lamp 31 (see FIG. 3) is forwarded to the filler 160 from the pixel electrode substrate 112, and then is released to the atmosphere through the heat dissipation fin 150.

In addition, a support surface 141 of the support member 140 supports the light blocking member 130. Specifically, the light blocking member 130 comes into contact with the support surface 141 positioned outside the pixel electrode substrate 112, and the support member 140 and the light blocking member 130 are fixed with an adhesive. The light blocking member 130 is made of aluminum having a low heat resistance through a die casting, and includes a light blocking portion 131 covering a peripheral portion of the transparent electrode substrate 111, and a heat dissipation fin 132 (corresponding to a heat dissipation portion according to an embodiment of the present invention) integrally formed with the light blocking portion 131.

The light blocking portion 131 of the light blocking member 130 covers the peripheral portion of the transparent electrode substrate 111 and blocks light from entering portions other than the effective pixels of the liquid crystal element 110. The heat dissipation fin 132 is provided with plural fins so as to increase a contact area with air by increasing a surface area. Thereby, heat from the light blocking portion 131, generated by the light from the lamp 31 (see FIG. 3) is released to the atmosphere through the heat dissipation fins 132.

The dust-proof rubber 120 is fixed to the light blocking member 130 so as to surround the outer peripheries of the light blocking portion 131 and the liquid crystal element 110. The dust-proof rubber 120 seals the peripheries of the liquid crystal element 110 and the light blocking portion 131, and form a sealed space 101 when the liquid crystal panel 100 is installed in the spacer plate 46 (see FIG. 2). The liquid crystal element 110 and the light blocking portion 131 positioned inside the dust-proof rubber 120 have a dust-proof structure, and thus prevents deterioration in picture quality due to the attachment of dirt or dust to the transparent electrode substrate 111.

Here, the liquid crystal element 110 and the light blocking portion 131 emit heat due to the light, generated from the lamp 31 (see FIG. 3), entering the transparent electrode substrate 111. Particularly, in recent years, the intensity of light entering the reflective liquid crystal panel 100 gradually increases in order to heighten the luminance. For this reason, the temperature of the liquid crystal element 110 and the light blocking portion 131 becomes high.

However, the liquid crystal panel 100 according to the first embodiment is provided with the heat dissipation fin 150 in the pixel electrode substrate 112 side of the liquid crystal element 110 via the heat-conductive filler 160 as described above. Thereby, even when the transparent electrode substrate 111 side is placed inside the sealed space 101, since the heat dissipation fin 150 is exposed to the atmosphere, the liquid crystal element 110 can be efficiently cooled.

In addition, the light blocking member 130 is provided with the heat dissipation fins 132 integrally formed with the light blocking portion 131. The heat dissipation fins 132 releases heat from the light blocking portion 131 to the outside of the dust-proof rubber 120. For this reason, even when the light blocking portion 131 is placed inside the sealed space 101, since the heat dissipation fins 132 release heat from the light blocking portion 131 to the outside (atmosphere), the light blocking portion 131 can be efficiently cooled. As a result, the radiation heat from the light blocking portion 131 to the liquid crystal element 110 is suppressed, and thus even if the luminance is heightened, deterioration in picture quality is prevented.

2. A Second Embodiment: A Configuration Example of the Image Display Device

Figure 6:
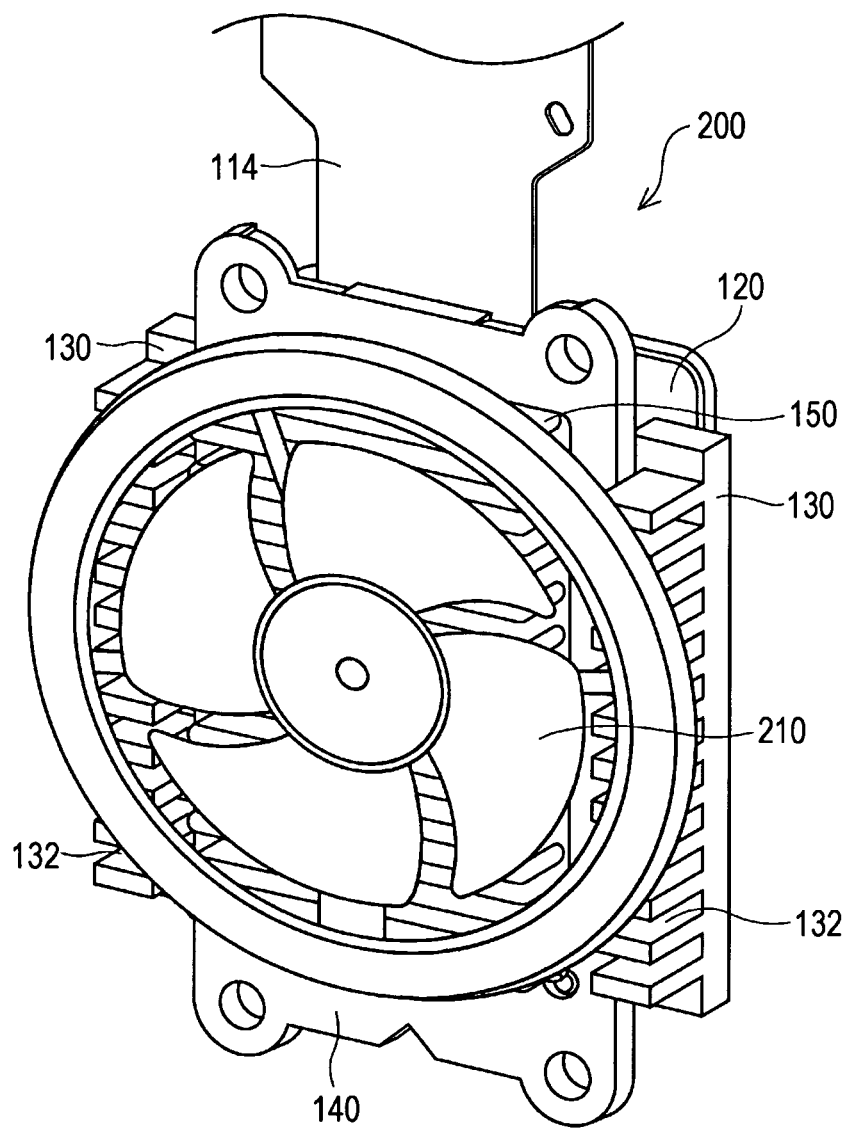
FIG. 6 is a perspective view illustrating a reflective liquid crystal panel (second embodiment) for a liquid crystal projector, as an image display device according to an embodiment of the present invention.
Figure 7:
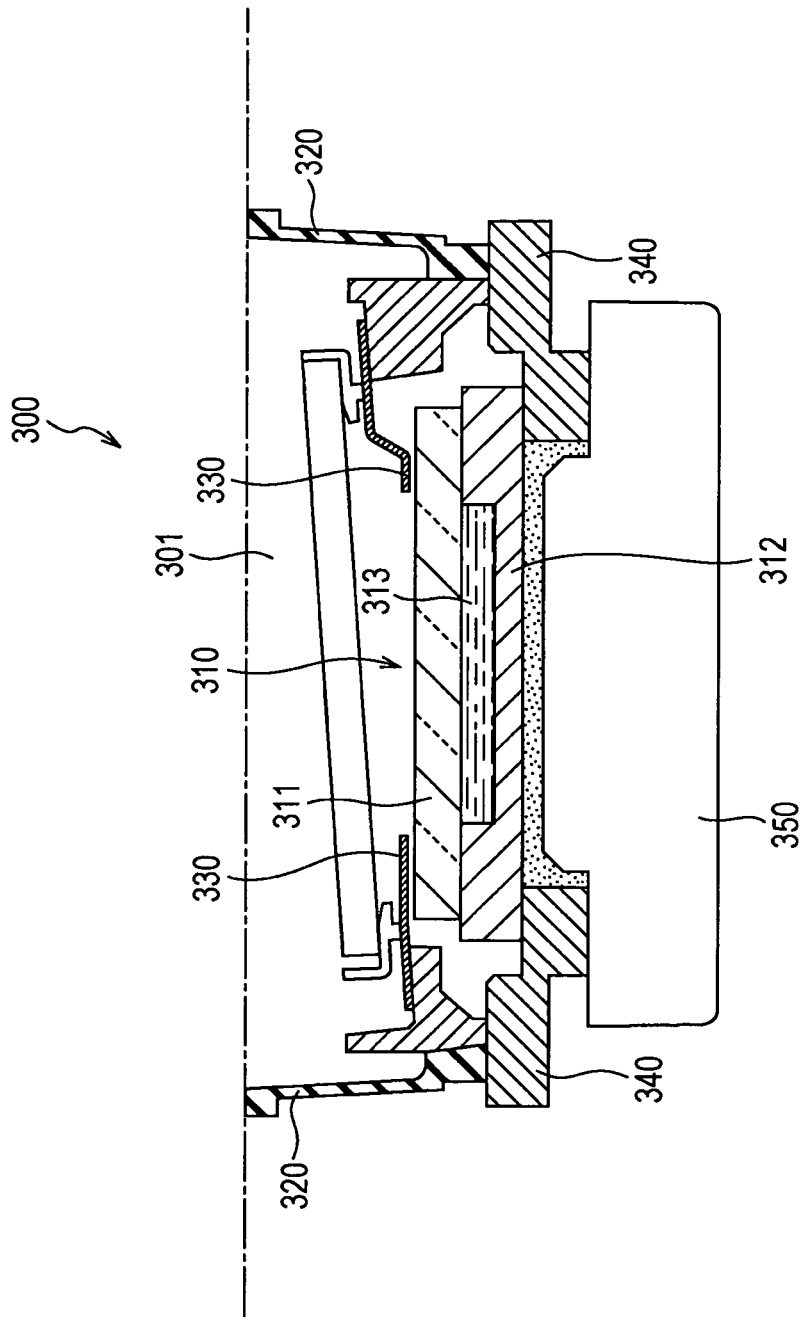
FIG. 7 is a cross-sectional view illustrating a reflective liquid crystal panel for a liquid crystal projector in the related art.

FIG. 6 is a perspective view illustrating a reflective liquid crystal panel 200 (the second embodiment) for the liquid crystal projector 10 (see FIG. 3), as an image display device according to an embodiment of the present invention.

The reflective liquid crystal panel 200 (corresponding to an image display element according to an embodiment of the present invention) according to the second embodiment shown in FIG. 6 includes the dust-proof rubber 120 which seals a peripheral portion of the liquid crystal element 110 such that the liquid crystal element 110 has a dust-proof structure, and the light blocking member 130 which blocks light from reaching the peripheral portion of the liquid crystal element 110, in the same manner as the liquid crystal display panel 100 according to the first embodiment shown in FIGS. 4 and 5. Further, the liquid crystal panel 200 includes the support member 140 which supports the liquid crystal element 110 and the heat dissipation fin 150 which cools the liquid crystal element 110.

Also, the liquid crystal panel 200 according to the second embodiment includes an active cooling fan 210 (corresponding to an active cooling unit according to an embodiment of the present invention) installed in the support member 140.

The active cooling fan 210 forcibly let out heat from the heat dissipation fins 132 or the heat dissipation fin 150 of the light blocking member 130 to the outside.

Specifically, the rotation of the active cooling fan 210 causes the ambient air of the heat dissipation fins 132 and the heat dissipation fin 150 to flow (blow or suck) and thus relieves the heat dissipation fins 132 and the heat dissipation fin 150 of heat. Thereby, the liquid crystal element 110 and the light blocking portion 131 shown in FIG. 4 can be cooled more efficiently.

As described above, although the embodiments of the present invention have been described, the present invention is not limited to the above-described embodiments but may have a variety of modifications.

For example, in the light blocking member 130 in the embodiments, the light blocking portion 131 and the heat dissipation fins 132 are physically formed as a single body through the aluminum die casting. However, the present invention is not limited thereto, but a light blocking portion and a heat dissipation portion made of various kinds of materials such as pure aluminum or copper having low heat resistance are respectively formed, and both of them may be joined together using an adhesive or the like having heat conductivity.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
an image display element that displays images;
a support member that supports the image display element;
a first heat dissipation member coupled to the support member to enable heat from the image display element to be released therefrom;
a light blocking member that includes a light blocking portion blocking light from reaching a peripheral portion of the image display element; and
a dust-proof member that is provided to surround outer peripheries of the image display element and the light blocking portion such that the image display element and the light blocking portion positioned inside the dust-proof member have a dust-proof structure,
wherein the light blocking member includes a second heat dissipation portion which is integrally formed with the light blocking portion and which enables heat to be released from the light blocking portion to an outside of the dust-proof member,
wherein the first heat dissipation member includes a first plurality of fins and the second heat dissipation portion includes a second plurality of fins, and
wherein the first plurality of fins and the second plurality of fins are respectively located on members which are separate from each other such that the first plurality of fins and the second plurality of fins are separate from each other.

2. The image display device according to claim 1, further comprising a active cooling unit that cools the light blocking portion by forcibly letting out heat from the heat dissipation portion.

3. A projection device comprising:
an image display element that displays images;
a support member that supports the image display element;
a first heat dissipation member coupled to the support member to enable heat from the image display element to be released therefrom;
a light blocking member that includes a light blocking portion blocking light from reaching a peripheral portion of the image display element;
a dust-proof member that is provided to surround outer peripheries of the image display element and the light blocking portion such that the image display element and the light blocking portion positioned inside the dust-proof member have a dust-proof structure;
a light source that generates light entering the image display element; and
a lens that projects images displayed in the image display element,
wherein the light blocking member includes a second heat dissipation portion which is integrally formed with the light blocking portion and which enable heat to be released from the light blocking portion to an outside of the dust-proof member,
wherein the first heat dissipation member includes a first plurality of fins and the second heat dissipation portion includes a second plurality of fins, and
wherein the first plurality of fins and the second plurality of fins are respectively located on members which are separate from each other such that the first plurality of fins and the second plurality of fins are separate from each other.

4. The image display device according to claim 1, wherein the second heat dissipation portion is arranged so as to be outside the dust-proof member.

5. The image display device according to claim 4, wherein the light blocking portion and the second heat dissipation portion of the light blocking member are formed as a single body.

6. The image display device according to claim 5, wherein the single body is formed from an aluminum or copper material.

7. The projection device according to claim 3, wherein the second heat dissipation portion is arranged so as to be outside the dust-proof member.

8. The projection device according to claim 7, wherein the light blocking portion and the second heat dissipation portion of the light blocking member are formed as a single body.

9. The projection device according to claim 8, wherein the single body is formed from an aluminum or copper material.

\* \* \* \* \*